(12) United States Patent
Tomkins et al.

(10) Patent No.: US 9,378,196 B1
(45) Date of Patent: Jun. 28, 2016

(54) ASSOCIATING INFORMATION WITH A TASK BASED ON A CATEGORY OF THE TASK

(71) Applicant: Google Inc., Mountain View, CA (US)

(72) Inventors: Andrew Tomkins, Menlo Park, CA (US); Tristan Harris, Los Gatos, CA (US); Shanmugasundaram Ravikumar, Berkeley, CA (US); Bo Pang, Sunnyvale, CA (US); Sujith Ravi, Santa Clara, CA (US); Can Sar, Mountain View, CA (US); Angelo DiNardi, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 14/065,125

(22) Filed: Oct. 28, 2013

Related U.S. Application Data (60) Provisional application No. 61/840,370, filed on Jun. 27, 2013.

(51) Int. Cl.
*G06F 17/20* (2006.01)
*G06F 17/24* (2006.01)
*G06F 17/30* (2006.01)
*G06F 17/27* (2006.01)

(52) U.S. Cl.
CPC ............ *G06F 17/243* (2013.01); *G06F 17/276* (2013.01); *G06F 17/30722* (2013.01)

(58) Field of Classification Search
CPC G06F 17/256; G06F 17/276; G06F 17/30722
USPC .......................... 715/256, 255, 254
See application file for complete search history.

(56) References Cited

U.S. PATENT DOCUMENTS

| | | | |
|---|---|---|---|
| 5,603,054 | A | 2/1997 | Theimer et al. |
| 6,842,877 | B2 | 1/2005 | Robarts et al. |
| 7,496,500 | B2 | 2/2009 | Reed et al. |
| 8,055,707 | B2 | 11/2011 | Desai et al. |
| 8,108,206 | B2 | 1/2012 | Hufnagel et al. |
| 8,364,467 | B1 | 1/2013 | Bowman et al. |
| 8,375,099 | B2 | 2/2013 | Carroll et al. |
| 8,417,650 | B2 | 4/2013 | Graepel et al. |
| 8,521,818 | B2 | 8/2013 | McGann et al. |
| 8,560,487 | B2 | 10/2013 | Jhoney et al. |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Mohammed-Ibrahim Zuberi
(74) *Attorney, Agent, or Firm* — Middleton Reutlinger (57) ABSTRACT

Methods and apparatus related to identifying a category for a task that is associated with a user and populating annotation fields related to the task based on the category of the task. The task and populated annotation fields may be provided for use by one or more application to provide a task completion step to the user. In some implementations, the category may be identified based on input from the user, documents of the user, and/or data that are associated with the user. In some implementations, a completion step for the task may be suggested to the user by an application that accesses the task and populated annotated information. In some implementations, multiple applications may suggest different completion steps to the user for the same task.

21 Claims, 5 Drawing Sheets

(56) References Cited

U.S. PATENT DOCUMENTS

| | | | |
|---|---|---|---|
| 8,599,801 B2 | 12/2013 | Baio et al. | |
| 8,639,552 B1* | 1/2014 | Chen | G06F 9/4881 705/7.21 |
| 2002/0156817 A1* | 10/2002 | Lemus | G06F 17/30569 715/256 |
| 2009/0307212 A1 | 12/2009 | Ramot et al. | |
| 2010/0287465 A1* | 11/2010 | Vuong | G06F 17/276 715/256 |
| 2012/0150532 A1 | 6/2012 | Mirowski et al. | |
| 2012/0239761 A1 | 9/2012 | Linner et al. | |
| 2012/0265819 A1* | 10/2012 | McGann | G06Q 30/00 709/204 |
| 2012/0317499 A1 | 12/2012 | Shen | |
| 2012/0331036 A1 | 12/2012 | Duan et al. | |
| 2013/0073662 A1 | 3/2013 | Meunier et al. | |
| 2013/0159270 A1 | 6/2013 | Urmy et al. | |
| 2013/0297551 A1* | 11/2013 | Smith | H04L 51/20 706/48 |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

* cited by examiner

To: Bob Smith
From: Jim Johnson
Re: Trip next week

Bob,
     Just a reminder that you have a trip to Los Angeles to book for next week. You have meetings on the morning of the 12th and all day on the 13th, so fly out on the 11th and back on the 14th.

Thanks,
                                      Jim

FIG. 4

| Flight Booking Task | | |
|---|---|---|
| 500 | | |
| 505A — Departure Location | SDF | — 510A |
| 505B — Departure Date | 1/11 | — 510B |
| 505C — Departure Time | | — 510C |
| 505D — Arrival Location | LAX | — 510D |
| 505E — Return Date | 1/14 | — 510E |
| 505F — Return Time | Any | — 510F |

ASSOCIATING INFORMATION WITH A TASK BASED ON A CATEGORY OF THE TASK

CROSS-REFERENCE TO RELATED DOCUMENTS

This application claims the benefit of U.S. Provisional Application No. 61/840,370, filed Jun. 27, 2013, and entitled "Associating Information with a Task Based on a Category of the Task," which is hereby incorporated by reference in its entirety.

BACKGROUND

This specification is directed generally to identifying a task that is associated with a user and associating information with the task based on a category of the task.

A user may perform one or more actions that are indicative of a task that the user intends to perform in the future. The task may have one or more completion steps to perform in order to complete the task.

SUMMARY

The present disclosure is directed to methods and apparatus for identifying a task of a user, determining a category for the task, identifying annotation fields that are related to the category, populating the annotation fields with information that is related to the task, and providing the task and populated annotation fields for use by one or more applications. In some implementations, a task may be associated with multiple categories and, for a given application, it may be determined that one or more of the categories is appropriate for the given application. In some implementations, each of the multiple categories that are identified for a task may be associated with a confidence level of the likelihood that the category is correct for the task.

In some implementations, a method is provided that includes the steps of: identifying a task of a user; determining a category of the task; identifying, based on the category, a plurality of annotation fields for the task; determining annotation field specific information related to the task, the information being related to one or more of the annotation fields for the task; and populating one or more of the annotation fields based on the annotation field specific information.

This method and other implementations of technology disclosed herein may each optionally include one or more of the following features.

The method may further include the steps of: receiving a task request, wherein the task request includes a requested category; determining the requested category is the category of the task; and providing the task and the populated annotation fields for use by one or more applications in response to the task request.

The category of the task may be based on a category input from the user.

The task may be identified from a document and the category of the task may be determined based on a format of the document. The category of the task may include at least one of a product purchase task, a product cancellation task, a contact task, and an appointment task.

The method may further include the steps of: identifying at least one entity associated with the task; and determining at least some of the annotation field specific information related to the task based on the identified entity.

At least some of the annotation field specific information may be based on user data associated with the user. The user data may include at least one of user contacts, user navigation history, and user e-mails.

The method may further include the steps of: receiving, by a given application of the applications, the task and one or more of the populated annotation fields; determining, by the given application, a suggested completion step for the task based on the populated annotation fields; and providing, by the given application, the suggested completion step for the task to the user. The suggested completion step for the task may be specific to the given application. The suggested completion step for the task may be determined based on a subset of the populated annotation fields. The step of providing the suggested completion step for the task to the user may be based on user input within the given application. The suggested completion step for the task may be based on user movement data. The method may further include the steps of: receiving, by a second given application of the applications, the task and one or more of the populated annotation fields; determining, by the second given application, a second suggested completion step for the task based on the populated annotation fields, the second suggested completion step being unique from the suggested completion step; and providing, by the given application, the second suggested completion step for the task to the user.

The method may further include the step of associating a confidence level with the category of the task, wherein the confidence level is based on the likelihood that the category of the task is correct.

The method may further include the steps of: determining a second category for the task; identifying, based on the second category, a second plurality of annotation fields for the task, wherein at least one of the second plurality of annotation fields is unique from the plurality of annotation fields; determining additional annotation field specific information related to the task, the information being related to one or more of the second plurality of annotation fields for the task; and populating one or more of the second plurality of annotation fields based on the annotation field specific information and the additional annotation field specific information. The method may further include the steps of: determining a first confidence level for the category of the task, the first confidence level indicative of the likelihood that the category is correct for the task; and determining a second confidence level for the second category of the task, the second confidence level indicative of the likelihood that the second category is correct for the task.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein identify one or more tasks that are associated with a user, identify a category for the task, determine annotation field information associated with the task, and provide the task and annotation field information for use by one or more applications. The annotation field information is determined based on the category of the task and represents a new aspect of the task. The task represents an intended action of the user and the associated annotation field information may be utilized to identify one or more steps for the user to complete the task. Particular implementations of the subject matter described herein may provide the task and associated annotation field information to one or more applications that may identify and provide completion steps for the task to the user based on the annotation field information.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

In some implementations, a user may be associated with one or more tasks that require action by the user to complete. For example, a user may be associated with the task of paying a bill, attending an event, and/or purchasing an item. One or more tasks may be associated with the user based on actions of the user, such as the user requesting that a task be associated with the user, and/or a task may be associated with the user based on information from one or more documents that are accessible by the user. For example, a user may submit a query that includes information that may be used to associate a task with the user, such as the query "pay my bill," which may be utilized to associate a task of paying a bill with the user.

A category may be determined for a task of the user. For example, a task may be categorized as a "purchase" task, an "appointment" task, and/or a "service cancellation" task. A category of a task may be determined based on one or more factors such as, for example, a title of the task, user input related to the task, and/or one or more properties of one or more documents associated with the task. A category of a task may be associated with one or more annotation fields specific to that category that may be populated with annotation field specific information related to the task. The task and the populated annotation fields may be provided for use by one or more applications.

As an example, a user task to purchase a new cell phone may be identified. A category of the task may be determined as a "purchase task" category. A "purchase task" category may be associated with multiple annotation fields such as "type of product to purchase", "potential products of the type of product", and "purchase locations". The annotation fields for the category may be populated based on annotation field specific information related to the user task. For example, "type of product to purchase" may be populated with an identifier for a cell phone; "potential products of the type of product" may be populated with an identifier of all available cell phone models or an identifier of a subset of one or more cell phone models based on, for example, user data indicating user interest in such cell phone models; and "purchase locations" may be populated with an identifier of all available sources for purchasing the identified cell phone models or an identifier of a subset of one or more such sources based on, for example, user interest or preference for such sources. The user task and the populated annotation fields may be provided for use by one or more applications. For example, the user task and the populated annotation fields may be stored in a database to enable one or more applications to retrieve the user task and populated annotation fields and determine a suggested completion step for the user task based on one or more of the populated annotation fields. For example, a user may access a mapping application that may retrieve the user task and the populated annotation fields to determine a suggested completion step of traveling to a purchase location indicated in the "purchase locations" annotation field, when the purchase location is determined to be proximal to the user and/or proximal to a mapping location requested by the user via the mapping application.

Figure 1:
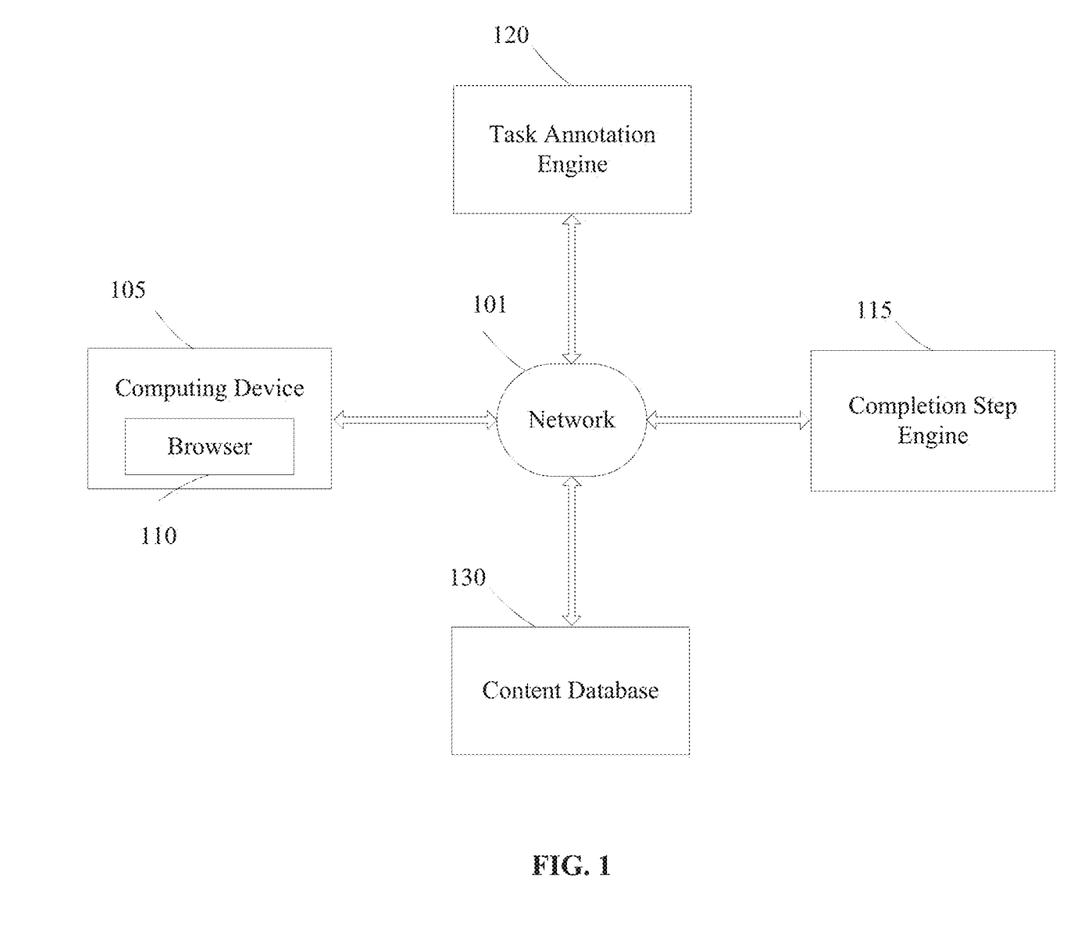
FIG. 1 is a block diagram of an example environment in which a method of associating information with a task based on a category of the task may be implemented.

Referring to FIG. 1, a block diagram is provided of an example environment in which a method of associating information with a task based on a category of the task may be implemented. The environment includes computing device 105 with web browser 110, a content database 130, a completion step engine 115, and a task annotation engine 120. The environment also includes a communication network 101 that enables communication between various components of the environment.

The computing device 105 executes one or more applications and may include hardware and/or software to enable identification of the geographic location of the computing device 105. As discussed herein, the computing device 105 may be utilized by a user to create a user task, to directly or indirectly provide information related to the user task, and/or to receive suggested completion steps from one or more applications that may utilize the user task and/or populated annotation fields to determine the suggested completion steps. The computing device 105 may be, for example, a desktop computer, a laptop computer, a cellular phone, a smartphone, a personal digital assistant (PDA), a wearable computing device (e.g., digital watch, earpiece, glasses), a tablet computer, a navigation system, and/or another computing device. The computing device 105 includes memory for storage of data and software applications, a processor for accessing data and executing applications, and components that facilitate communication over a communication network 101. In some implementations, the computing device 105 may include a web browser 110. The operations performed by the computing device 105 may be distributed across multiple computer systems.

Task annotation engine 120 may identify a task associated with a user, determine a category for the task, determine annotation fields that are specific to the category, and/or populate the determined annotation fields with determined annotation field specific information. As discussed herein, task annotation engine 120 may identify a task associated with the user, a category for the task, annotation fields that are specific to the category, and/or annotation field specific information for the task utilizing one more databases that may share one or more aspects with content database 130.

Task annotation engine 120 may identify a task that has already been associated with a user and/or may associate a task with a user. For example, task annotation engine 120 may access content database 130 to identify one or more tasks that have been previously associated with the user. The content database 130 may include one or more storage mediums. For example, in some implementations the content database 130 may include multiple computer servers each containing one or more storage mediums. In some implementations, content database 130 may store additional information about one or more tasks that has been previously associated with the tasks. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

In some implementations, one or more tasks may be associated with the user based on the user selecting the tasks from a provided list of task suggestions. For example, a user may be provided with a selection of task suggestions based on a query or a partial query that is entered by the user, and the user may select one or more of the task suggestions to associate the task(s) of the one or more task suggestions with the user. Task suggestions may be identified, for example, based on a stored list of task suggestions, previously entered queries of the user, and/or personal attributes of the user. In some implementations, a task may be associated with the user based on information that has been identified in one or more applications and/or documents of the user, such as a calendar application, emails, and/or navigation history of the user. For the purposes of this specification, a document is any data that is associated with a document address. Documents include webpages, word processing documents, portable document format (PDF) documents, images, video, audio, e-mails, calendar entries, task entries, and feed sources, to name just a few. The documents may include content such as, for example, words, phrases, pictures, audio, task identifiers, entity identifiers, etc.; embedded information (such as meta information and/or hyperlinks); and/or embedded instructions (such as JavaScript scripts).

In some implementations, a potential task of a user may be identified based on one or more documents associated with the user and the user may confirm an association with the task through one or more actions. For example, one or more potential tasks of a user may be identified based on emails and/or navigation history of the user, and the user may select a task from a provided list of one or more tasks that were identified based on the emails and/or navigation history. The user may, for example, receive an email that includes one or more terms that are commonly associated with a task, such as the term "bill amount:" followed by a monetary amount, and the user may be provided with a suggestion to initiate an association of a bill payment task with the user.

In some implementations, a task may be associated with a user based on explicit task input from the user. For example, a user may provide input related to one or more tasks of a user via one or more applications accessed via computing device 105. For example, the user may access a task application via computing device 105 that enables entry and management of user tasks and, utilizing the task application, the user may provide input related to one or more tasks.

Task annotation engine 120 may determine a category for an identified task of a user. Task annotation engine 120 may determine the category based on a category that has already been associated with an identified task and/or may determine the category based on information associated with the identified task. In some implementations, terms from one or more documents that were utilized to identify a task of a user may be utilized to determine a category for the task. For example, an email may be utilized to associate a task with the user based on the term "monthly statement" in the subject line of the email, which may be indicative of a monthly bill of the user. "Bill payment" may be determined as the category of the task based the presence of those same terms ("monthly statement") and/or additional terms in the email that are associated with a "bill payment" task category. For example, additional terms such as "amount due", "methods of payment", "submit payment", "account", etc. may be indicative of "bill payment" task category. Also, for example, text in the body of an email may be utilized to determine a category of a task, such as an "appointment" task category for a task that was identified based on an email that includes the terms "appointment reminder". Also, for example, terms in calendar entries, contact entries, and/or other documents that were utilized to identify a task may be utilized to determine the category for the identified task. As discussed herein, in some implementations, terms from one or more documents that were not utilized to identify a task of a user (e.g., other user documents) may be utilized to determine a category for the task.

In some implementations, the location of multiple terms relative to one another in a document may be utilized to determine a category for a task. For example, a task may be identified from an email, and "pay a bill" may be identified as the category of a task based on the term "amount" occurring within a certain term distance of the term "due"; the terms "amount due" occurring within a certain term distance of any monetary amount; the term "due date" occurring within a certain term distance of any calendar date, and/or "payment location:" followed immediately by an address.

In some implementations one or more terms may be weighted in determining a category of a task. For example, a term may be weighted based on a term frequency inverse document frequency (TFIDF) weighting of the term. Also, for example, a term may be weighted based on its location(s) in a document. For example, a term that appears in the subject line of an e-mail may be weighted more heavily than a term that appears in the body of an e-mail. Also, for example, a term that appears in the first sentence of an email may be weighted more heavily than a term that appears in the last sentence of an e-mail. Also, for example, a term that appears in a text segment (e.g., a paragraph and/or a sentence) that is identified as a boilerplate text segment may be weighted less heavily than a term that appears in a text segment that is not identified as a boilerplate text segment.

In some implementations, the format of one or more documents that were utilized to identify a task of a user may be utilized to determine a category for the task. The format of a document may be based on, for example, HTML tags in a document, XML tags in a document, and/or text type formatting (e.g., bold, underlining, italics). For example, an email may be identified that includes the formatting tags "<price>," "<due_date>," and "<address>;" and the task annotation engine 120 may determine that the associated task is of a "bill payment" task category based on the presence of the tags. Also, for example, an email may be identified that includes one or more formatting attributes that indicate the email is a flight reservation email conforming to a category of "flight reservation". For example, the formatting of the subject line of the email and/or one or more aspects of the body of the email may indicate the email is a flight reservation email.

In some implementations, task annotation engine 120 may identify the category of a task based on the source of one or more documents utilized in identifying the task. For example, task annotation engine 120 may be provided with a task and the document that was utilized to initially associate the task with the user; and the task annotation engine 120 may determine the category of the task based on the source of the provided document. For example, a task may be identified based on an e-mail and the sender of the e-mail may be utilized to determine a category of the task. For example, if the sender of the e-mail is an entity that is focused on travel reservations, the category of the task may be "travel reservation". Also, for example, if the sender of the e-mail is associated with the air travel division of the entity that is focused on travel reservations, the category of the task may be "airline travel reservation". Also, for example, if a meeting task is identified based on an e-mail, the category of the task may be a "personal meeting" if the sender of the e-mail is a personal friend of the user (e.g., as determined from the user's contacts), but may be a "business meeting" category if the sender is a business contact of the user (e.g., as determined from the user's contacts).

In some implementations, multiple categories may be identified for a task. For example, a task may be identified based on a calendar entry that includes a date and a location, but no additional information. The task annotation engine 120 may determine that the location is associated with a building that houses both a tax preparation service and a widget store that sells widgets. Based on such a determination, task annotation engine 120 may identify the task as being associated with both an "appointment" task category (tax preparation service) and a "purchase" task category (widget store). A confidence level may be associated with each of the categories to identify the confidence that the category is the correct category. For example, if no additional information is obtained regarding the task, then the "appointment" task category (tax preparation service) and a "purchase" task category (widget store) may both be associated with the same confidence level (e.g., indicative of 50% likelihood the task category is correct).

In some implementations the task annotation engine 120 may identify additional information from one or more documents and/or databases to determine a confidence level for each of the multiple task categories based on the identified additional information. The identified additional information may be indicative of one or more of the identified multiple categories of the task and confidence levels may be assigned to such one or more categories based on the likelihood that the category is the correct category for the task. For example, continuing with the preceding example, task annotation engine 120 may determine that the task is more likely to be an "appointment" task category than a "purchase" task category based on identifying a contact for the tax preparation service in a contacts list of the user and not identifying any information about the widget store in documents of the user. Based on such a determination, the task annotation engine 120 may determine a confidence level for the category of "appointment" that is more indicative of confidence in that category than a confidence level determined for the category of "purchase". Also, for example, task annotation engine 120 may instead determine that the task is more likely to be a "purchase" task category than an "appointment" task category based on identifying significant recent navigation history of the user related to widgets.

In some implementations, the task annotation engine 120 may access an entity database in determining a task, a category for a task, and/or annotation field specific information for the task based on the category. An entity database may include associations between two or more entities. In some implementations, entities are topics of discourse. In some implementations, entities are persons, places, concepts, and/or things that can be referred to by a text fragment (e.g., a term or phrase) and are distinguishable from one another (e.g., based on context). For example, the term "cell" on a webpage may potentially refer to multiple entities such as an abbreviation for cellular phone, a biological unit, and/or a room to hold prisoners. In some implementations, an entity may be referenced by a unique entity identifier that may be used to identify the entity. The unique entity identifier may be associated with one or more properties associated with the entity and/or with other entities. In some implementations, one or more entity databases may include properties associated with unique identifiers of one or more entities. For example, for each of a plurality of entities, a mapping (e.g., data defining an association) between the entities and one or more properties and/or other entities related with the entity may be identified in the entity database. For example, a unique identifier for the entity associated with "Business1" may be associated with a name or alias property of "Bus. 1" (an abbreviated version of Business1), a phone number property, an address property, and/or an entity type property of "cellular phone retail location" in the entity properties database. Additional and/or alternative properties may be associated with an entity in one or more databases.

Figure 5:
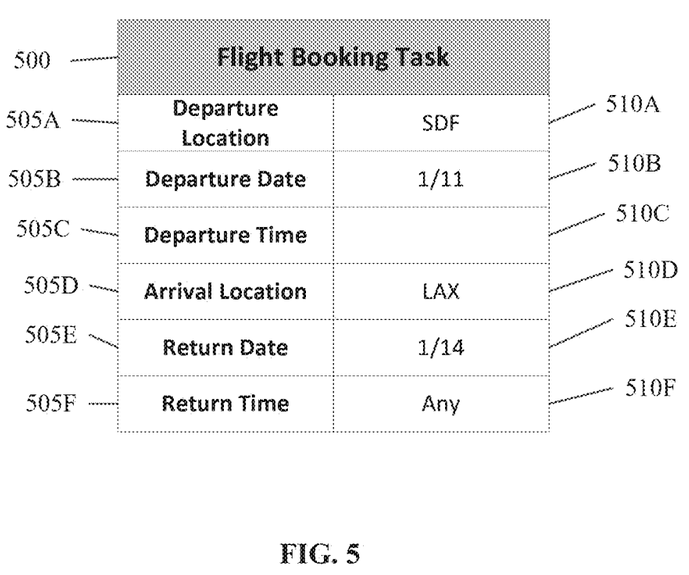
FIG. 5 illustrates annotation fields that may be associated with a task to book a flight.

Task annotation engine 120 may determine annotation fields for the task and such one or more annotation fields may be populated with annotation field information. Task annotation engine 120 may identify the annotation fields and/or annotation field information from one or more databases that may share one or more characteristics with content database 130. In some implementations, the annotation fields that are associated with a task may be related to the category of the associated task. Each category may have annotation fields that are specific to the category based on, for example, the type of information that is appropriate for the category. For example, a "purchase product" task category may include annotation fields for, inter alia, the cost of a product, the location where a product may be purchased, and/or the type of product that is to be purchased. Also, for example, an "appointment" task category may include annotation fields for, inter alia, an appointment date, appointment location, and/or a contact name for the appointment. In the preceding examples, a product cost annotation field may not be appropriate for an "appointment" task category and a contact name annotation field may not be appropriate for a "purchase item" task category. As another example of annotation fields for a category, a "flight booking" task category may include annotation fields of, for example, "Departure Location," "Departure Date," "Departure Time," "Arrival Location," "Return Date," and/or "Return Time." FIG. 5 illustrates example annotation fields and populated annotation information for a "flight booking" task category as described herein.

In some implementations, an annotation field may be populated with annotation field information that includes text. For example, an annotation field of "Arrival Location" may be populated with the text "Los Angeles." As discussed herein, text may be identified from one or more user actions and/or one or more documents that are associated with the task. In some implementations, an annotation field may be populated with a pointer and/or identifier that references one or more entities. For example, an annotation field for "Arrival Location" of a "flight booking" task may be populated with a pointer to an entity that is associated with the airport Los Angeles International Airport. Also, for example, an annotation field may be populated with a URL of a webpage and/or a memory location that references a file and/or document. In these examples, the reference that may populate an annotation field may be utilized to identify and/or retrieve the corresponding information. For example, a pointer that populates an annotation field for "airport" may be a pointer to an entity in an entity database for "Los Angeles International Airport" and an alias of the entity, such as "LAX," may be later identified for the entity based on the pointer.

In some implementations, one or more annotation fields may be populated directly by the user. For example, the user may be provided with a graphical user interface to prompt the user to enter additional information for one or more annotation fields associated with the task. Task annotation engine 120 may provide a graphical user interface to the user to display on computing device 105 via communication network 101. For example, task annotation engine 120 may identify a task of a "purchase item" task category and task annotation engine 120 may provide a prompt to the user to enter information to populate one or more annotation fields of the "purchase item" task category, such as the product to be purchased, the price of the product, and/or a location to purchase the product.

In some implementations, task annotation engine 120 may identify annotation field information from additional or alternative sources besides the user entering annotation field information. For example, for a "pay cell phone bill" task category, task annotation engine 120 may identify the name of the cell phone provider based on one or more terms of an email of a user, but not identify the amount of the bill. Task annotation engine 120 may prompt the user through a graphical user interface on computing device 105 to enter information that the task annotation engine 120 was unable to identify, such as the amount of the bill. In some implementations, the user may be prompted to verify identified annotation field information and/or to alter identified annotation field information. For example, task annotation engine 120 may have high confidence that a billing amount is correct based on one or more terms in an email, but may have low confidence that the name of the billing company is correct. The user may be prompted to verify the billing company name and may have the option to update and/or alter the billing company name.

In some implementations, one or more annotation fields may be populated with annotation field information that is determined based on similarity between known information about the task and one or more entities that are identified in an entity database. For example, a task of a "purchase item" task category may be associated with a retailer of "Business1". Task annotation engine 120 may identify an entity in an entity database with an alias of "Business1" and populate one or more annotation fields for the task category with additional information based on one or more entities that are associated with the identified entity. For example, the entity with the alias "Business1" may be identified and utilized to further identify one or more retail locations of "Business1," and one or more annotation fields of the task may be populated with annotation field information related to the one or more identified retail locations of the business.

In some implementations, one or more annotation fields may be populated with annotation field information that is based on information that is identified in one or more user documents. User documents may include emails, navigation history, calendar entries, user contacts, and/or other documents of the user. Task annotation engine 120 may be provided with one or more documents and/or addresses where documents are located and identify information contained in the documents to populate one or more annotation fields. In some implementations a document may be the same document that was utilized to initially identify the associated task. In some implementations, a different document may be utilized to identify annotation field information than the document that was utilized to identify the associated task. For example, a task and a contact for a task may be initially identified based on information from a calendar application entry. Task annotation engine 120 may identify a contact address from a contacts application for the contact that is included with the appointment task and associate such additional information about the contact with the task.

In some implementations, the navigation history of a user may be utilized to identify annotation field information. For example, task annotation engine 120 may be provided with the address of one or more webpages that were visited by the user, an address where a listing of one or more visited webpages are located, and/or a representation of the content of one or more webpages that were visited by the user, such as a text file of the content of a webpage or an HTML file of a webpage. Also, for example, navigation history may include a user navigating one or more documents of the user, such as files that are locally stored with the user and/or emails. For example, task annotation engine 120 may identify a task to purchase a cellular phone that has been determined to be of a "purchase a product" task category. Task annotation engine 120 may identify annotation fields that are associated with a "purchase a product" task category such as a "Product Type" annotation field. Task annotation engine 120 may further determine navigation history of the user that includes an indication of the user reading multiple user reviews for a cellular phone of Product Type X. Task annotation engine 120 may populate the "Product Type" annotation field with Product Type X information based on such navigation history.

In some implementations, one or more emails of a user may be utilized to identify annotation field information. For example, task annotation engine 120 may identify a task to purchase a cellular phone that has been determined to be of a "purchase a product" task category. Task annotation engine 120 may identify annotation fields that are associated with a "purchase a product" task category such as a "Purchase Location" annotation field. Task annotation engine 120 may further identify one or more user emails that are associated with the task, such as an email that includes an advertisement for cellular phones. Task annotation engine 120 may populate the "Purchase Location" annotation field for an address to purchase a cellular phone based on one or more terms in the user email, such as a listing of the address and/or the name of the retail store in the email.

A user task and associated populated annotation fields may be provided for use by one or more applications by the task annotation engine 120 via communication network 101, such as an application that is executing on computing device 105. In some implementations, task annotation engine 120 may store the user task and populated annotation fields associated with the user task in a database such as content database 130. One or more applications may access the database to identify the task and utilize the associated populated annotation fields. In some implementations, the user task and associated task category and/or populated annotation fields may be directly provided to one or more applications.

The application that is provided with the task may determine a task completion step based on the associated information. For example, task annotation engine 120 may provide a user task of renewing a cell phone contract and an associated populated annotation field that identifies an address for a retail store to a mapping application that is executing on computing device 105. The mapping application may determine that the user is near the address of the retail store and provide the user with directions to the retail store as a task completion step. In some implementations, a task with one or more task completion steps may be provided to one or more applications by the completion step engine 115. The completion step engine 115 may determine one or more completion steps for a user task based on one or more populated annotation fields associated with the user task and provide the determined completion steps to one or more applications. For example, completion step engine 115 may be provided with the user task of paying a cell phone bill and associated populated annotation fields including populated annotation fields having due date information related to the task and a location related to the task. The completion step engine 115 may provide a calendar application with a task completion step to pay the cell phone bill by the due date at the location. In some implementations, completion step engine 115 may be a module of the application that is provided the task and populated annotated fields. For example, the completion step engine 115 may be a module of a mapping application that is executing on computing device 105 and/or accessed via computing device 105.

In some implementations, the task completion step may be related to the type of application that is provided the task and the populated annotation fields by the task annotation engine 120 and/or accesses the task and populated annotation fields via content database 130. For example, the task annotation engine 120 may identify a task that is associated with the user and that is of a "pay a bill" task category. The task annotation engine 120 may determine annotation fields for that task category and determine annotation field information associated with the task to populate the annotation fields. The task may be associated with a populated "Due Date" annotation field identifying a due date of "May 1" and a populated "Location" annotation field identifying the name of a retail location of the cellular phone provider of the user. The due date and retail location may be identified by the task annotation engine 120 utilizing one or more techniques described herein (e.g., based on emails, navigation history, input from the user, related information in a database). The task and the populated annotation fields may be provided to a calendar application, which may add an appointment task to a calendar on the due date of the bill. Additionally or alternatively, a mapping application may be provided the same task and populated annotation fields, and provide the user with a task completion step of a path for the user to traverse to locate the retail store. Also, for example, a web browser may be provided the same task and populated annotation fields, and provide the user with a task completion step of a navigating to a website associated with the retail store.

Thus, multiple applications may have access to a user task and associated populated annotation fields. Each of the applications may individually utilize such associated populated annotation fields. For example, each application may provide one or more completion steps based on such information, wherein the completion steps may be tailored to the application providing the completion steps. Also, as discussed herein, each of the applications may determine a category of the task based on the annotation fields associated with the task and/or an identifier of the category associated with the task. Based on the determined category of the task, a given application may optionally tailor suggested completion steps specific to that category. For example, for a task to buy a cell phone that is of a "product purchase" task category, a mapping application may provide directions to a cell phone provider identified in a populated annotation field to enable the user to purchase the product and may also provide the user with the option to view recent reviews for the product to be purchased. On the other hand, for a task to pay a cell phone bill that is of a "bill payment" task category, a mapping application may provide directions to a cell phone provider identified in a populated annotation field to enable the user to pay the cell phone bill without providing the user with additional information.

In some implementations, an application may identify multiple tasks of a user and determine one or more tasks that are suited for the particular application. In some implementations, whether a task is determined to be suited for the particular application may be based on one or more categories associated with the task. For example, a mapping application may utilize only user tasks that are of a category type that includes an address as an annotation field.

In implementations where a confidence level is assigned to one or more task categories that are associated with a task, an application may determine for which category of a task to provide suggested completion steps based on the confidence level that the category for the task is the correct category. For example, a web browser may identify a task that is more likely to be of a "purchase" task category than an "appointment" task category, and utilize the task as a "purchase" task category to direct the user to a webpage where the associated item may be purchased as a suggested completion step. On the other hand, a web browser may identify a task that is more likely to be of an "appointment" task category than a "purchase" task category, and utilize the task as an "appointment" task category to direct the user to a webpage where directions to the appointment location may be displayed and/or more information about the appointment location may be provided. Also, for example, the web browser may be capable of utilizing tasks of either an "appointment" task category or a "purchase" task category, but may be better suited to utilize tasks of a "purchase" task category. In some implementations, for a task that is identified as being of both an "appointment" and a "purchase" task category, the web browser application may utilize the task as an "appointment task" if the appointment task has a higher confidence level, even though the category of the task is less suited for the application than a "purchase task."

In some implementations, a confidence level associated with a potential task category for a user task may be utilized by the application that is provided the task to further adjust the confidence level. For example, a task may be provided to a web browser application that is associated with a user action related to a cellular phone and is associated with the potential categories of "purchase" and "pay bill". Each of the potential categories may optionally be associated with a corresponding confidence level, and user actions via the web browser application may be utilized to adjust the confidence level of one or both of the categories. For example, the user may enter the search query "pay my cell" and the web browser may adjust the confidence level for the "pay bill" category in a positive manner based on the search query input of the user to reflect the higher likelihood that the task is of a "pay bill" category. Also, for example, the user may have visited one or more cell phone review webpages via the web browser application and the web browser may adjust the confidence level for the "purchase" category in a positive manner based on the navigation history of the user to reflect the higher likelihood that the task is of a "purchase" category.

In some implementations, a suggested completion step provided to a user may be based on the movements and/or current location of the user. For example, the completion step engine 115 may be provided with the current location of a user. The task annotation engine 120 may identify a task of the user and a "purchase item" category for the task. Task annotation engine 120 may identify a populated annotation field that is associated with the task that identifies a retail store at which the task may be completed. Completion step engine 115 may provide the user with a task suggestion of a path from the current location of the user to the retail store. Also, for example, the completion step engine 115 may identify a path that the user is traversing or intending to traverse, and provide a diversion path from the intended path of the user to the retail store where the user may complete the task.

In some implementations, the suggested task completion step for a task may be specific to the category of the provided task. For example, completion step engine 115 may not suggest a task completion step of paying a cellular phone bill for a task that is associated with the category of "appointment", if the task that is provided has no relation to paying a cellular phone bill. Also, for example, a task associated with the category of "appointment" or a task that is associated with the category of "payment of a bill" may have a suggested task completion step that includes directions to a location (e.g., appointment location and bill payment location). Also, for example, a task that is associated with the category of "appointment" may have "Call Bob" as the suggested task completion step, and a task that is associated with the category of "payment of a bill" may have a suggested task completion step of "navigate to www.business.com". In some implementations, a task may be identified with multiple categories and different completion steps may be provided for the task based on the application that is provided the completion step. For example, a task may be associated with both an "appointment" task category and a "purchase" task category. The "appointment" task category completion step of "call to book flight by August 1" may be provided to a cellular phone application, and the "purchase" task category completion step of "go to www.airline.com" may be provided to a web browser application.

As described herein, in some implementations a user task may be identified as having multiple categories. For example, task annotation engine 120 may identify a task that is potentially of an "appointment" category and potentially of a "purchase" category. Task annotation engine 120 may identify one or more documents that are associated with the user task and determine a confidence level for each task category that is a potential task category for the user task. In some implementations, completion step engine 115 may provide a task completion step based on the potential task category that has the highest likelihood of being the correct task category for the user task. For example, the completion step engine 115 may provide a task completion step that is for an "appointment" category if the confidence level that the task is of an "appointment" category is greater than the confidence level that the task is a different category, such as a "purchase" category. Populated annotation field information utilized to determine the completion step may be specific to the selected category. For example, for a task that is associated with both an "appointment" category and a "purchase" category, completion steps for the "appointment" category may be based on populated annotation fields specific to the "appointment" category.

In some implementations, the completion step that is provided to an application for a user task that is associated with multiple categories may differ based on the application that is being provided the task completion step. For example, a task may be categorized as an "appointment" category and as a "purchase" category. A calendar application may be provided the user task as an "appointment" category based on the preference of the calendar application in processing "appointment" categories over "purchase" categories; and the completion step engine 115 may provide the user a task completion step based on the identified annotation fields for an "appointment task." A web browser may be provided a task completion step for a "purchase item task" based on a preference of "purchase item tasks" for the web browser. In some implementations, the application may be able to utilize multiple categories of tasks, and the task completion engine 115 may provide the application with a task completion step based on the associated category of the task that has the highest confidence level, as described herein.

In some implementations, an application that may determine and/or utilize completion steps for multiple types of categories may have a preference for tasks that are associated with one category over one or more other categories. The application may utilize tasks that are associated with a preferred category regardless of any other categories that may be associated with the task. For example, a task that is associated with an "appointment task" and any other category may always be utilized as an "appointment task" for a calendar application. In some implementations, an application may utilize a non-preferential category of a task even if a preferred category is associated with the task if the non-preferential category has a confidence level that satisfies a threshold.

In some implementations, the task completion step for a task may be specific to the populated annotation fields that are provided with the task. For example, completion step engine 115 may not suggest a task completion step of a path for the user to locate a location where the task may be completed when the populated annotation fields do not include an address for a location where the task may be completed. Also, for example, completion step engine 115 may not suggest a task completion step that identifies a specific product for a task if a product is not identified in the annotated fields for the task. In some implementations, the user may further provide information to the completion step engine 115 to supplement missing annotated information. For example, the user may be associated with a task of a "purchase item" category and the application that is provided the task with populated annotation fields that is missing the item that is to be purchased may prompt the user to enter the product name. Completion step engine 115 may utilize the additional information that is provided by the user to suggest a task completion step.

In some implementations, the user task may be identified as suitable for a human-based fulfillment application. A human-based fulfillment application may be an application where one or more other users may provide completion steps to a user based on a provided user task and/or offer to complete provided completion steps associated with a user task. For example, a human-based fulfillment application may display one or more user tasks to other users, and the other users may suggest steps that the user may perform to complete the task. In some implementations, the human-based fulfillment application may provide tasks to one or more other users, and the users may offer to complete the task for the user. For example, the task may be provided to one or more other users and the other users may offer the user services to complete the task. Also, for example, the other users may offer competing bids to the user for the services to complete a task and the user may choose one of the users to provide the service to complete the task based on the offered services and/or cost of services.

In some implementations, the task may be explicitly annotated as suitable for a human-based fulfillment application. For example, a task may be associated with an annotation field that specifically identifies that the task should be provided to and/or accessible by a human-based fulfillment application. Also, for example, a task may be associated with an annotation field that is populated with information that is indicative of suitability with a human-based fulfillment application. For example, a user may be associated with a task that has an associated annotation field of "Item to Purchase" that is populated with "ceiling fan." The task may be identified as suitable for a human-based fulfillment application based on the likelihood that a user would not install a ceiling fan and/or may need assistance from another user to complete the task. Also, for example, a task may be categorized as a reminder task, and the reminder may be to perform a housing project, such as repair a roof, and the category and task may be likely to be provided to a human-based fulfillment application. In this example, the task may be provided to the human-based fulfillment application based on, for example, the type of task and the likelihood that the task is of a type that is unlikely to be completed by the user.

In some implementations, the category of a task may be indicative of a type of task that is suited for a human-based fulfillment application. In some implementations, the category of a task may be of a type that is commonly provided to a human-based fulfillment application. For example, a task may be associated with a "home improvement task" category and/or a "repair task" category and the user task may be provided to a human-based fulfillment application as a suitable task for the application. In some implementations, both the task category and one or more populated annotation fields may be utilized to determine whether the task is suitable for a human-based fulfillment application based on such category association. For example, a task may be a "home improvement task," which may have a task description of "mowing the lawn" (a minor task) or "repairing a roof" (a task that may require assistance). Information from the task description annotation field may be utilized to determine that the "home improvement task" is a significant task and provide the task to a human-based fulfillment application.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Many other configurations are possible having more or less components than the environment shown in FIG. 1. For example, although the components are each illustrated alone in FIG. 1, it is understood that one or more of the completion step engine 115, the task annotation engine 120, and/or the computing device 105 may be combined in one or more configurations in some implementations.

Figure 2:
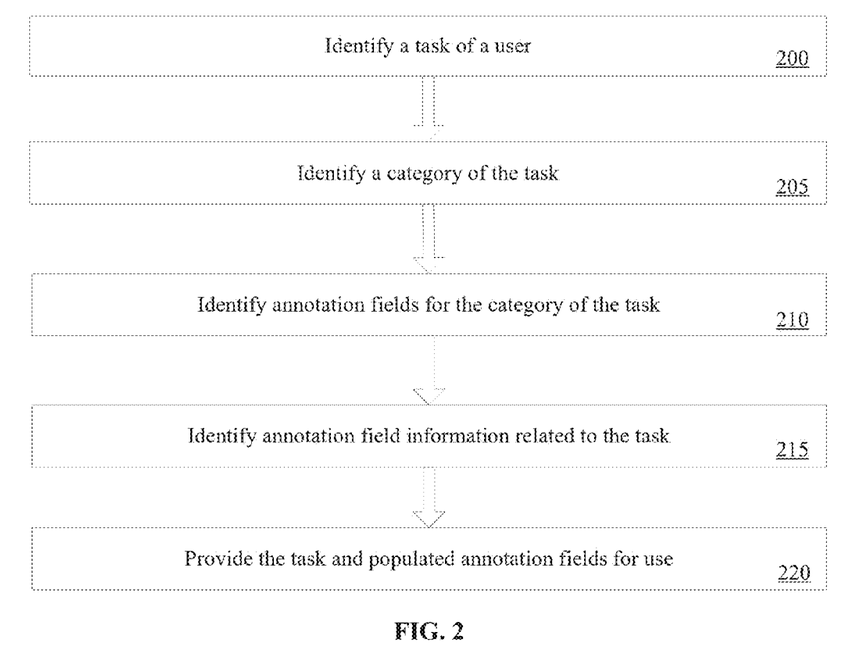
FIG. 2 is a flow chart illustrating an example method of associating information with a task based on a category of the task.

Referring to FIG. 2, a flow chart illustrating an example method of associating information with a task based on a category of the task is provided. Other implementations may perform the steps in a different order, omit certain steps, and/or perform different and/or additional steps than those illustrated in FIG. 2. The steps of the method illustrated in FIG. 2 may be performed by one or more components illustrated in FIG. 1.

At step 200, a task that is associated with a user is identified. The task may be identified by a task annotation engine that shares one or more characteristics with task annotation engine 120. In some implementations, the task may be associated with the user based on one or more actions for the user. For example, a task may be associated with a user based on a request by the user on a computing device that shares one or more characteristics with the computing device 105. In some implementations, the task may be associated with the user based on information that is identified in one or more documents of the user, such as emails, entries in a calendar application, navigation history, and/or entries in a contacts application. For example, an email may be identified for a bill to pay a cellular phone and the task of "pay cellular phone bill" may be associated with the user based on one or more terms and/or the format of the email that includes a bill for the cellular phone service of the user.

In some implementations, a navigation history of a user may be based on a record of one or more indications of actions taken by a user. The actions may include, for example, search queries submitted by a user to an Internet search engine, user selections of search results provided by the search engine, resources selected and/or visited by the user, and so on. A "selection" of the search result or the resource may include, for example, a mouse-click, a click-through, a voice-based selection, a selection by a user's finger on a presence-sensitive input mechanism (e.g., a touch-screen device), and/or any other appropriate selection mechanism.

At step 205, a category of the task is identified. The category of the task may be identified by one or more components that share characteristics with the task annotation engine 120. In some implementations, the category that is identified for a task may be provided by the user. For example, the user may utilize computing device 105 to specify the category at the time that the task is initially associated with the user and/or at a later time, such as before a task completion step is determined by the completion step engine 115. In some implementations, a confidence level may be associated with the category of the task to identify the confidence that the category is the correct category for the task. In some implementations, a task may be associated with multiple categories. In some of those implementations, the multiple categories may be associated with confidence levels based on the likelihood that the category is the valid category for the task.

At step 210, annotation fields are identified for the category that is identified at step 205. Annotation fields for a category may be identified by a component that shares one or more characteristics with task annotation engine 120. Categories may have different annotation fields based on the type of information that is desired for the particular category. In some implementations, the category of the task may be utilized to determine the annotation fields that are associated with the task. For example, an appointment task category may not have an annotation field to associate a product type with the task, whereas a purchase category task may include a product type annotation field. Also, for example, an appointment category task may have an appointment time as an annotation field, whereas a purchase category task may not. In some implementations, one or more annotation fields may be present in multiple categories of tasks. For example, both an appointment task and a purchase task may have an annotation field for the date when the appointment is to take place and the date when a purchase must be made, respectively.

At step 215, annotation field information related to the task is identified. The annotation field information may be utilized to populate the annotation fields identified at step 210. For example, a task category may be associated with an annotation field of "Due Date" which may be populated with a date by identifying information in one or more documents of the user. Also, for example, annotation fields may be populated with information that has been directly provided by the user as described herein. In some implementations, annotation field information may not be identifiable for one or more of the annotation fields. For example, a task of a "purchase a product" category may have an annotation field to associate a date by when the product must be purchased, but annotation field information for that annotation field may not be identifiable. In some implementations, additional information may be associated with empty annotation fields at a later time. For example, a user may be prompted to enter information for an empty annotation field before a task completion step is provided to the user.

At step 220, the task and one or more populated annotation fields for the task are provided for use by one or more applications. In some implementations, the task and annotation fields may be provided to a database and/or an application by a module that shares one or more aspects with task annotation engine 120. In some implementations, the application that receives the task may include a completion step engine 115 that may provide a task suggestion to the user based on the task and the provided annotation fields. For example, the completion step engine 115 may be provided a task to book an airline flight and the task annotation engine 120 may provide the task annotation engine 120 the task and populated annotation fields that include a flight date, a destination, and/or an airport. The task annotation engine 120 may optionally provide different annotation fields to different applications based on the type of application that is being provided with the task. For example, the task annotation engine 120 may provide a calendar application with the date and airport for a flight for a purchase task. The task annotation engine 120 may provide a mapping application with the address of the airport and the date of the flight for the same task. In some implementations, the provided populated annotation fields may be associated with a category and provided based on the category. For example, the category of the task may be utilized to determine the type of application which may be provided the task. In some implementations, a suggested completion step may be identified and provided to the user based on one or more steps of the method of FIG. 3.

In some implementations when a task is associated with multiple categories, one of the categories may be identified as a valid category based on the application that is being provided the task and populated annotated fields. For example, a task may be identified as related to a birthday of a contact. The task may be categorized as an appointment task when the task is provided to a calendar application to mark the birthday in a calendar. The same task may be identified as a purchase task when the task is provided to a web browser, and the task completion step may be to direct the user to an online retailer to purchase a gift. In some implementations, the task may be provided to an application with multiple potential task categories and the application may determine which task category to utilize with the task, as described herein. In some implementations, confidence levels may be assigned to multiple potential task categories for user task and an application may determine which task category to utilize based on the assigned confidence levels, as described herein.

Figure 3:
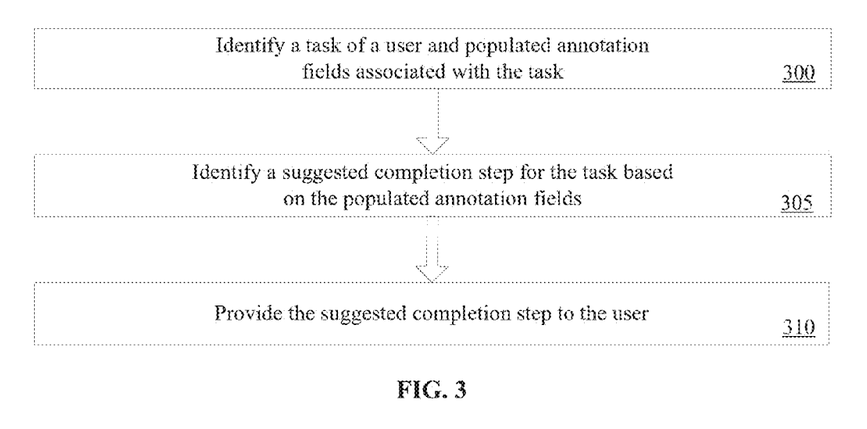
FIG. 3 is a flow chart illustrating an example method of providing a suggested completion step for a task based on one or more populated annotation fields associated with the task.

Referring to FIG. 3, a flow chart illustrating an example method of providing a suggested completion step for a task based on one or more populated annotation fields associated with the task is provided. Other implementations may perform the steps in a different order, omit certain steps, and/or perform different and/or additional steps than those illustrated in FIG. 3. The steps of the method illustrated in FIG. 3 may be performed by one or more components illustrated in FIG. 1.

At step 300, a task and one or more populated annotation fields that are associated with the task are identified. In some implementations, the task and the populated annotation fields may be made available by task annotation engine 120 and/or task annotation engine 120 to a module that shares one or more characteristics with completion step engine 115. Also, for example, the task and populate annotation fields may be identified by the completion step engine 115 from a database, such as content database 130.

The task may be additionally associated with a category for the task. For example, the task annotation engine 120 may identify the category of a task as an appointment task and task annotation engine 120 may provide the category with the task to completion step engine 115. Also, for example, completion step engine 115 may identify the category of the task from task information that has been stored in content database 130. In some implementations, the populated annotation fields may be utilized by the completion step engine 115 to determine the category of the task. For example, a task may include an annotation field of "due date" and "price" and the completion step engine 115 may determine that the task is of a "purchase" category.

At step 305, a completion step suggestion is identified based on the provided task and the populated annotation fields that are associated with the user task. The completion step may be identified by one or more modules that share one or more characteristics with the completion step engine 115. In some implementations, the completion step may be identified based on one or more actions of the user. For example, the completion step engine 115 may be provided with a task of "pay a bill" with a populated annotated field for the address of a retail location at step 300. The completion step engine 115 may additionally be provided with the current location of the user, such as via a GPS sensor of computing device 105, and determine that the user is within a threshold distance to the retail location. Completion step engine 115 may identify a path from the current location of the user to the retail location where the task may be completed as a suggested completion step.

In some implementations, a suggested completion step may be identified by the completion step engine 115 when the user accesses one or more applications on a computing device, such as computing device 105. For example, the user may access a mapping application and the completion step engine 115 may identify a task completion step that utilizes the mapping application, such as directions to a destination where a task may be completed. Also, for example, the completion step engine 115 may identify an appointment task for the same task when a calendar application is accessed by the user.

In some implementations, the completion step engine 115 may identify a task completion step based on a category of a task that is identified for a task. In some implementations, the completion step engine 115 may identify a task completion step based on the information that has been identified by the task annotation engine 115 and associated with the task. The task completion step that is identified by the completion step engine 115 may be based on the populated annotation fields that include information about the task. For example, the completion step engine 115 may identify a task completion step that includes directions to a location where the task may be completed when the task is associated with populated annotation fields that include an address. In some implementations, a task may have annotation fields associated with it that are not populated with associated data. For example, the task annotation engine 120 may not have identified a location where a user may pay a bill in a "pay bill" task, but a due date for the bill may be identified. The completion step engine 115 may identify a task completion step to pay the bill on a specific date because a due date for the task is known, but may not identify a task completion step of identifying a location without location information that is associated with the task.

At step 310, the suggested completion step is provided to the user. In some implementations, the suggested completion step may be provided to the user by one or more modules that share aspects with completion step engine 115. In some implementations, the task may be provided to a computing device of the user, such as computing device 105, via communication network 101. For example, the completion step engine 115 may identify a task completion step of traveling to a destination to pay a bill. The completion step engine 115 may provide an application executing on and/or accessed via computing device 105 with the location of a retail store where the user can pay a bill and/or a path for the user to traverse to arrive at the retail store.

Figure 4:
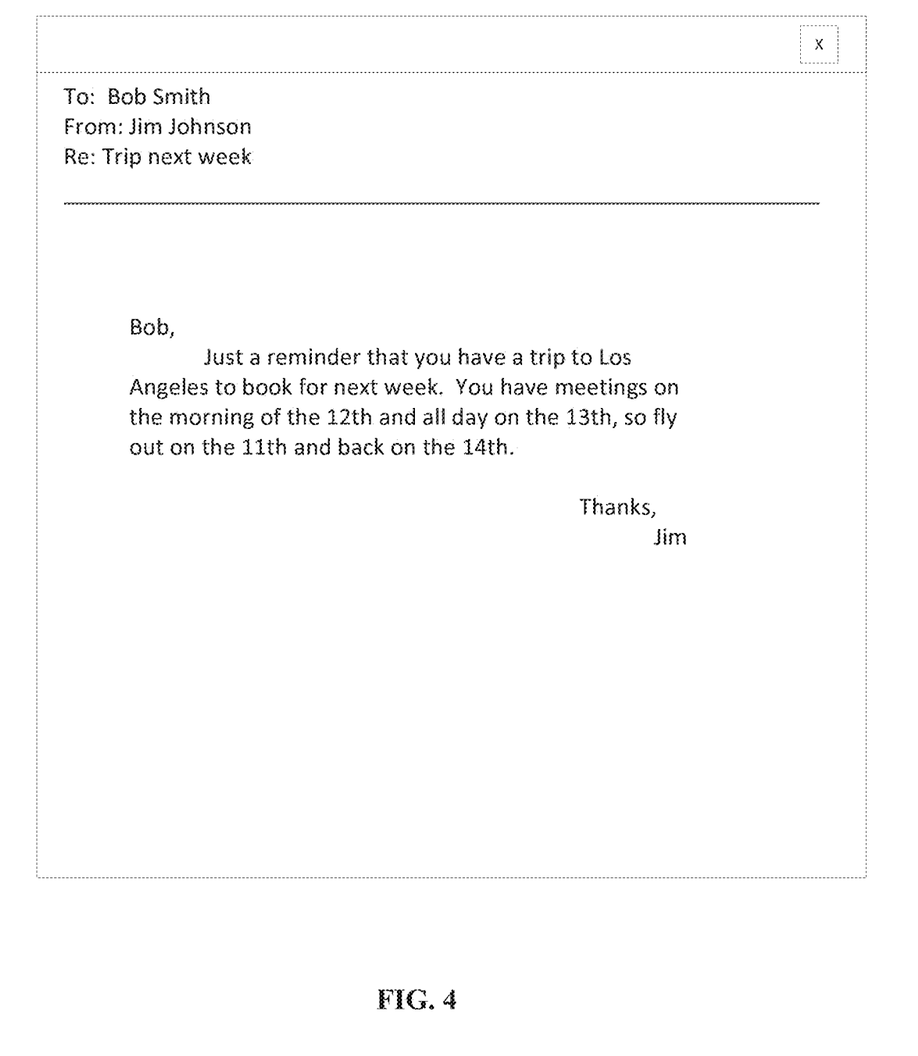
FIG. 4 is an example of a user document that may be utilized to identify information to populate annotation fields that are associated with a task.

Referring to FIG. 4, an example of a user document that may be utilized to identify information to populate annotation fields that are associated with a task is illustrated. In some implementations, the user document of FIG. 4 may be provided to a user via a computing device that shares one or more characteristics with computing device 105. In some implementations, the user document may be stored locally on computing device 105, accessed remotely via communication network 101 from one or more content databases 130, and/or accessed through web browser 110 on computing device 105. The user document of FIG. 4 may be provided to the user through an email application on computing device 105. However, other implementations may identify information about a task from one or more alternative types of documents, such as text files, calendar appointment entries, and/or personal contact entries.

In some implementations, task annotation engine 120 may be provided with a task that is associated with a user, and one or more documents that are associated with the task. For example, task annotation engine 120 may identify a task related to booking an airline flight and the document of FIG. 4, which has been identified as related to the task. Task annotation engine 120 may determine the task is of a "purchase airline tickets" category and may identify annotation fields based on such category. Examples of annotation fields for a task that is "purchase airline tickets" that has been identified as a purchase task are illustrated in FIG. 5 and described herein. In some implementations, task annotation engine 120 may identify a category for the task based on information in the document. For example, the document contains the term "Trip," "fly," and "reminder", which are indicative of a "purchase airline tickets" category.

Task annotation engine 120 may identify information in the document to populate one or more of the annotation fields that are associated with the category. For example, the task annotation engine 120 may utilize the text of the document of FIG. 4 to identify the dates of a flight and the destination of the flight. In some implementations, task annotation engine 120 may identify information to associate with a task based on the proximity of one or more terms. For example, task annotation engine 120 may identify the term "trip" and "Los Angeles" as closely occurring in the document of FIG. 4 and determine that information to populate the annotation field of a destination of the task is likely "Los Angeles." In some implementations, the user may be further prompted on computing device 105 to verify that the trip destination is "Los Angeles." In some implementations, task annotation engine 115 may determine information that is associated with the task based on the format of one or more terms in the document, such as "Destination:" followed by a city name. Also, for example, the format of one or more terms may be utilized to determine associated information, such as the likelihood that "the 14th" is a date.

In some implementations, task annotation engine 120 may identify additional information to associate with the task based on one or more entities from an entity database. For example, the document includes the destination as "Los Angeles." Task annotation engine 120 may identify an entity that is associated with the city of "Los Angeles" and that is mapped to an entity associated with the airport LAX. The task annotation engine 120 may identify aliases of the entity that is associated with the airport LAX, such as "LAX" or "Los Angeles International Airport." Based on one or more such aliases, task annotation engine 120 may populate an annotation field of the task with information that corresponds to a location where the task may be completed, such as the arrival location annotation 505D, and the arrival location information of "LAX."

Referring to FIG. 5, annotation fields that may be associated with a task to book a flight are illustrated. The annotation fields may vary depending on the category of task that has been identified by the task annotation engine 120. In some implementations, a task may be associated with multiple categories. For example, a task may be an appointment task to utilize with a calendar application, and the same task may be categorized as a purchase task to be utilized by a mapping application. In some implementations, the annotation fields that are associated with multiple task categories may be combined. In other implementations, the annotation fields that are pertinent to each associated category of a task may be stored separately. For example, a task may be categorized as a purchase task and an appointment task. The task may have separate fields for a date associated with each task or the task may have one annotation field and be associated with one date. Multiple dates may be necessary if the appointment date is, for example, a birthday party and the purchase date is a reminder to purchase a present before the birthday party.

In the illustration, multiple annotation fields for a flight booking task 500 are illustrated. The annotation fields include information that may be utilized to suggest a task completion step to a user, including a departure location 505A, a departure date 505B, a departure time 505C, an arrival location 505D, a return date 505E, and a return time 505F. The annotation fields may be utilized to suggest to the user to purchase tickets by a certain date using the departure date 505B, and/or the user may be provided with directions to an airport using the departure location 505A.

In the illustration, the annotation fields are associated with information that is related to the task. The information may be identified by the task annotation engine 120 based on one or more techniques described herein. Information about some annotation fields has been identified for the fields in FIG. 5, such as the departure location information 510A, the departure date information 510B, the arrival location information 510D, and the return date information 510E. The task annotation engine 120 may have utilized, for example, the document in FIG. 4 to determine the information as previously described. The departure time information 510C does not include associated information. In some implementations, information may be missing due to the task annotation engine 120 being unable to locate the information. The return time information 510F is not a particular value but is instead "Any," indicating that any available return times are acceptable. The task annotation engine 120 may identify that any return time is acceptable based on information from one or more documents of the user, for example, or the task annotation engine 120 may associate a default value with one or more annotation fields when particular values are undetermined. In some implementations, a user may be prompted to enter information to associate with one or more annotation fields and/or to alter the information in one or more annotation fields.

Figure 6:
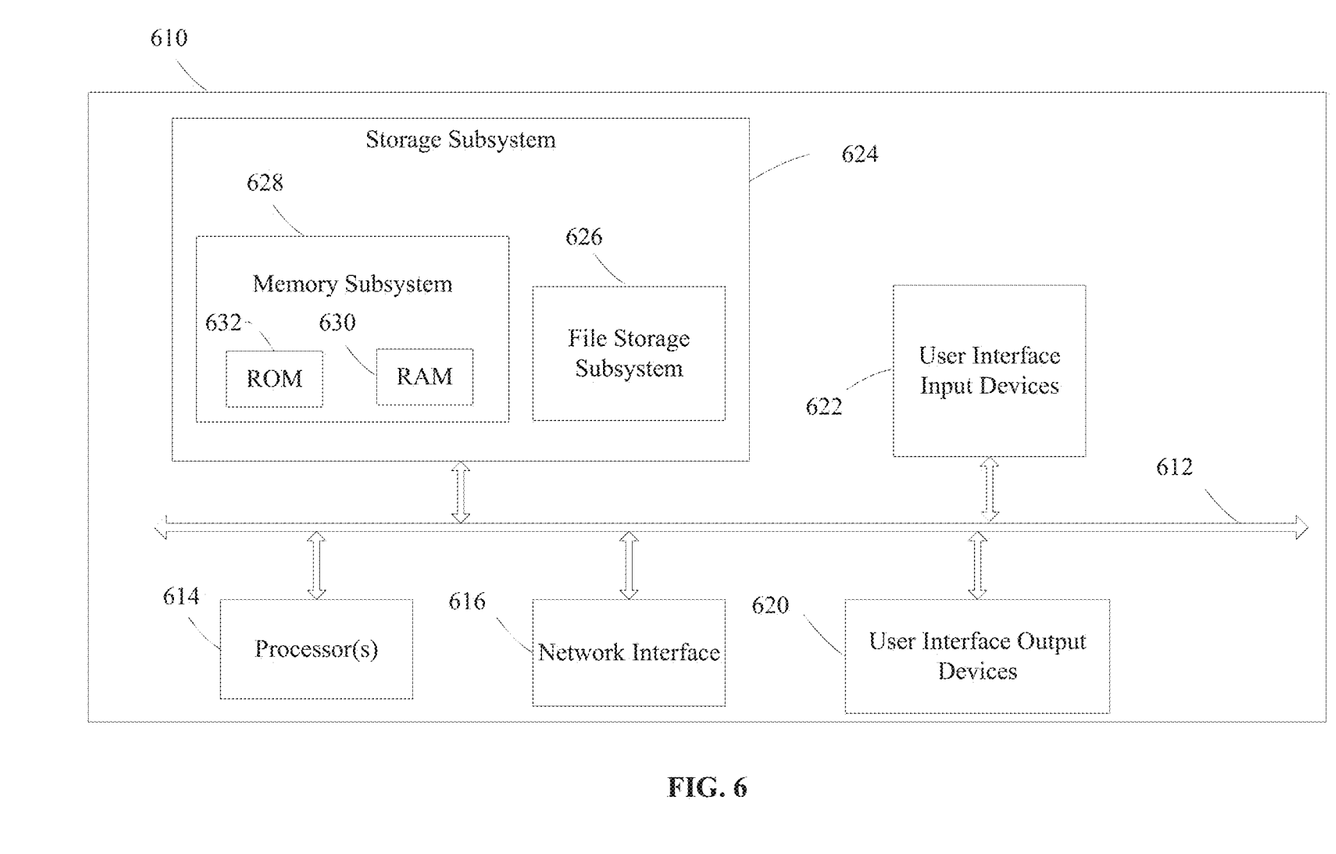
FIG. 6 illustrates a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to identify a task that is associated with a user and provide the task and populated annotation fields of the task to one or more applications according to one or more processes described herein.

These software modules are generally executed by processor 614 alone or in combination with other processors. Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method, comprising:
    identifying, by one or more processors, a task of a user;
    determining, by one or more of the processors, a category of the task;
    identifying, by one or more of the processors and based on the category, a plurality of annotation fields for the task;
    determining, by one or more of the processors, annotation field specific information related to the task, the annotation field specific information being related to one or more of the annotation fields for the task; and
    populating, by one or more of the processors, one or more of the annotation fields based on the annotation field specific information;
    determining, by one or more of the processors, a second category for the task;
    identifying, by one or more of the processors and based on the second category, a second plurality of annotation fields for the task, wherein at least one of the second plurality of annotation fields is unique from the plurality of annotation fields;
    determining, by one or more of the processors, additional annotation field specific information related to the task, the additional annotation field specific information being related to one or more of the second plurality of annotation fields for the task; and
    populating, by one or more of the processors, one or more of the second plurality of annotation fields based on the additional annotation field specific information.

2. The method of claim 1, further comprising:
    receiving a task request, wherein the task request includes a requested category;
    determining the requested category is the category of the task; and
    providing the task and the populated annotation fields for use by one or more applications in response to the task request.

3. The method of claim 1, wherein the category of the task is based on a category input from the user.

4. The method of claim 1, wherein the task is identified from a document and the category of the task is determined based on a format of the document.

5. The method of claim 1, further comprising:
    identifying at least one entity associated with the task; and
    determining at least some of the annotation field specific information related to the task based on the identified entity.

6. The method of claim 1, wherein at least some of the annotation field specific information is based on user data associated with the user.

7. The method of claim 1, further comprising:
    receiving, by a given application, the task and one or more of the populated annotation fields;
    determining, by the given application, a suggested completion step for the task based on the populated annotation fields; and
    providing, by the given application, the suggested completion step for the task to the user.

8. The method of claim 7, wherein the suggested completion step for the task is specific to the given application.

9. The method of claim 7, wherein the suggested completion step for the task is determined based on a subset of the populated annotation fields.

10. The method of claim 7, wherein the step of providing the suggested completion step for the task to the user is based on user input within the given application.

11. The method of claim 7, wherein the suggested completion step for the task is based on user movement data.

12. The method of claim 7, further comprising:
    receiving, by a second given application, the task and one or more of the populated annotation fields;
    determining, by the second given application, a second suggested completion step for the task based on the populated annotation fields, the second suggested completion step being unique from the suggested completion step; and
    providing, by the second given application, the second suggested completion step for the task to the user.

13. The method of claim 1, further comprising associating a confidence level with the category of the task, wherein the confidence level is based on the likelihood that the category of the task is correct.

14. The method of claim 1, further comprising:
    determining a first confidence level for the category of the task, the first confidence level indicative of the likelihood that the category is correct for the task; and
    determining a second confidence level for the second category of the task, the second confidence level indicative of the likelihood that the second category is correct for the task.

15. A system, comprising:
    memory storing instruction; and
    one or more processors operable to execute the instructions stored in the memory, wherein the instructions comprise instructions to:
    identify a task of a user;
    determine a category of the task;

identify, based on the category, a plurality of annotation fields for the task;
determine annotation field specific information related to the task, the annotation field specific information being related to one or more of the annotation fields for the task; and
populate one or more of the annotation fields based on the annotation field specific information;
determine a second category for the task;
identify, based on the second category, a second plurality of annotation fields for the task, wherein at least one of the second plurality of annotation fields is unique from the plurality of annotation fields;
determine additional annotation field specific information related to the task, the additional annotation field specific information being related to one or more of the second plurality of annotation fields for the task; and
populate one or more of the second plurality of annotation fields based on the additional annotation field specific information.

16. The system of claim 15, wherein the instructions further include instructions to:
receive a task request, wherein the task request includes a requested category;
determine whether the requested category is the category of the task; and
provide the task and the populated annotation fields for use by one or more applications in response to the task request.

17. The system of claim 15, wherein at least some of the annotation field specific information is based on user data associated with the user.

18. The system of claim 15, wherein the instructions further include instructions to:
receive, by a given application, the task and one or more of the populated annotation fields;
determine, by the given application, a suggested completion step for the task based on the populated annotation fields; and
provide, by the given application, the suggested completion step for the task to the user.

19. The system of claim 18, wherein the suggested completion step for the task is specific to the given application.

20. The system of claim 18, wherein the instructions further include instructions to:
receive, by a second given application, the task and one or more of the populated annotation fields;
determine, by the second given application, a second suggested completion step for the task based on the populated annotation fields, the second suggested completion step being unique from the suggested completion step; and
provide, by the second given application, the second suggested completion step for the task to the user.

21. The system of claim 15, wherein the instructions further include instructions to:
determine a first confidence level for the category of the task, the first confidence level indicative of the likelihood that the category is correct for the task; and
determine a second confidence level for the second category of the task, the second confidence level indicative of the likelihood that the second category is correct for the task.

* * * * *